(12) United States Patent
Ritthaler et al.

(10) Patent No.: US 7,681,517 B2  
(45) Date of Patent: Mar. 23, 2010

(54) ACTIVELY LIT POINTER

(75) Inventors: Matthew Ritthaler, Trenton, MI (US); Michael J. Luettgen, Bloomfield Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 112 days.

(21) Appl. No.: 12/039,199

(22) Filed: Feb. 28, 2008

(65) Prior Publication Data

US 2009/0217865 A1 Sep. 3, 2009

(51) Int. Cl.
*G01D 11/28* (2006.01)
*G01D 13/22* (2006.01)

(52) U.S. Cl. .................. 116/288; 116/328; 116/332; 116/DIG. 6; 362/26

(58) Field of Classification Search .............. 116/284, 116/286–289, 296, 303, 305, 319, 327, 328, 116/332, 62.1, DIG. 5, DIG. 6, DIG. 36; 362/23, 26–30

See application file for complete search history.

(56) References Cited

U.S. PATENT DOCUMENTS

| 3,300,572 | A | 1/1967 | Dahlgren et al. |
| 5,211,128 | A | 5/1993 | Katoh et al. |
| 5,372,087 | A | 12/1994 | Kato et al. |
| 5,630,373 | A | 5/1997 | Kato et al. |
| 5,636,589 | A | 6/1997 | Kato et al. |
| 5,747,743 | A | 5/1998 | Kato et al. |
| 5,806,954 | A | 9/1998 | Butt et al. |
| 6,082,288 | A | 7/2000 | Kato et al. |
| 6,314,908 | B1 | 11/2001 | Olbrich et al. |
| 6,408,783 | B1 | 6/2002 | Ludewig |
| 6,490,992 | B2 * | 12/2002 | Olbrich et al. .............. 116/288 |
| 6,606,961 | B1 | 8/2003 | Noll et al. |
| 7,520,241 | B2 * | 4/2009 | Pala et al. .................. 116/62.1 |

FOREIGN PATENT DOCUMENTS

EP 811827 A1 * 12/1997
JP 2002357462 A * 12/2002

* cited by examiner

*Primary Examiner*—Amy Cohen Johnson
(74) *Attorney, Agent, or Firm*—Dickinson Wright PLLC

(57) ABSTRACT

A pointer for an instrument panel which is actively lighted and, more specifically, an actively lighted pointer including a flex circuit.

31 Claims, 5 Drawing Sheets

ACTIVELY LIT POINTER

CROSS REFERENCE TO RELATED APPLICATIONS

None.

STATEMENT REGARDING FEDERALLY SPONSORED RESEARCH OR DEVELOPMENT

None.

BACKGROUND OF THE INVENTION

1. Technical Field

This present invention is directed to a pointer for an instrument panel which is actively lighted and, more specifically, an actively lighted pointer including a flex circuit.

2. Discussion

Vehicle manufactures continually strive to differentiate vehicles in the marketplace by providing unique styling and aesthetic features. As part of this differentiation many manufactures attempt to provide a unique cockpit look and feel for the operator of the vehicle. As part of this unique look and feel, each vehicle manufacturer attempts to have a different appearance to their instrument panels and gauges, however, manufacturers have been limited in differentiating instruments panels and gauges by the types, sizes and requirements of available pointers, particularly for pointers that are lighted. The amount of required space for each pointer sweeping about its rotational axis, and in particular for speedometer pointers, also limited the available design options.

Traditionally, instrument panels and gauges were back lighted, which limited the number of design options for instrument panels. The pointers are generally substantially located above the surface plate of the instrument panel and lighted pointers received light from under the surface of the instrument panel, generally through a light pipe extending cylindrically upward about the rotational axis. The design requirements for lighted pointers significantly limited the style of gauges and pointers that could be used. In particular for longer lighted pointers, such as most speedometer pointers, larger light pipes were required and the pointers were difficult to uniformly and brightly light along their length. Furthermore, due to the length of some pointers, and in particular speedometer pointers, any bends, such as bends required if a portion of the pointer was located under the surface plate of the instrument panel, decreased the available light along the length of the pointer and made the pointer difficult to light. Therefore, especially for speedometer pointers, most speedometer gauges were significantly constrained in style and function and they also occupied a large space on the instrument panel.

To differentiate instrument panels and gauges, some manufacturers have attempted to actively light pointers, in particular longer pointers. Actively lighted pointers generally include an LED within the pointer, typically on the moveable portion of the pointer some distance from the rotational axis of the pointer. An actively lighted pointer is desirable because it allows unique pointers to be developed, thereby providing differentiation of gauges and instrument panels between manufacturers. Actively lighted pointers also can provide greater contrast and a brighter pointer for the user.

To light the pointer, the LED must receive power, yet be powered in such a way that the pointer is free to operationally rotate as needed over a significant number of cycles. The power supply to the LED in the pointer must also be sufficiently small, minimizing the amount of space required within the instrument panel. One problem with using actively lighted pointers is providing a durable power supply between the LED and a control circuit that requires minimal space. As illustrated in FIG. 1, labeled as Prior Art, to power LEDs in actively lighted pointers, typically a flex circuit is wound loosely around the rotational axis like a clock spring. This clock spring approach provides the necessary slack in the power supply to allow the pointer to sweep back and forth freely. One problem with the clock spring technique is that it requires a large open space along the pointer drive motor shaft underneath the pointer to allow for wrapping of the flex and any winding control features to maintain an orderly flex circuit winding action. As vehicle instrument panels include more functions and also have become thinner, there is a need for a flex circuit power supply that minimizes the amount of the space and in particular minimizes the amount of space required around the drive shaft or axis of rotation of the pointer.

SUMMARY OF THE INVENTION

In view of the above, the present invention is directed to a pointer for an instrument panel which is actively lighted and, more specifically, an actively lighted pointer including a flex circuit that requires minimal space.

The instrument panel includes at least one actively lighted pointer having a base. The base has an arcuate portion that includes an arcuate channel having sidewalls and a channel bottom. Extending from the base is an elongated member. The elongated member may form at least a portion of the visible pointer, however in the illustrated embodiment, the base and elongated portion are behind the instrument panel backing plate and not visible to the operator of the vehicle. The backing or surface plate of the instrument panel is typically the plate or panel with markings viewed by the operator of the vehicle. The actively lighted pointer further includes a lighted portion visible to the operator of the vehicle and lighted by an LED located some distance from the rotational axis of the pointer.

The actively lighted pointer further includes a lighting system including the LED as well as a power supply mechanism, such as a flex circuit. The flex circuit to minimize the required operational space is not wound cylindrically around the rotational axis of the pointer as illustrated in the prior art FIG. 1, but instead includes an arcuate member that extends only partially around rotational axis of the pointer and fits at least partially within the arcuate channel. Furthermore, the flex circuit is designed to minimize required space by having its lateral extent approximately aligned perpendicular to the drive shaft axis and not aligned with the drive shaft axis. The flex circuit allows rotational movement by being folded over itself, instead of being tightened and loosened about the rotational axis as the pointer moves. Therefore, the flex circuit minimizes the required space as the radius range of the folded over portion is substantially equal to that of the arcuate portion remaining within the arcuate channel. By using an arcuate flex circuit that folds over on itself, at least a portion of the area surrounding the rotational axis is free from obstruction, which may allow other devices to be located in the unobstructed area.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is directed to a pointer assembly 10 for an instrument panel 20, such as instrument panels found in vehicles. The pointer assembly 10 may be used with the various gauges on an instrument panel to display and communicate vehicle status information to the vehicle operator.

Figure 1:
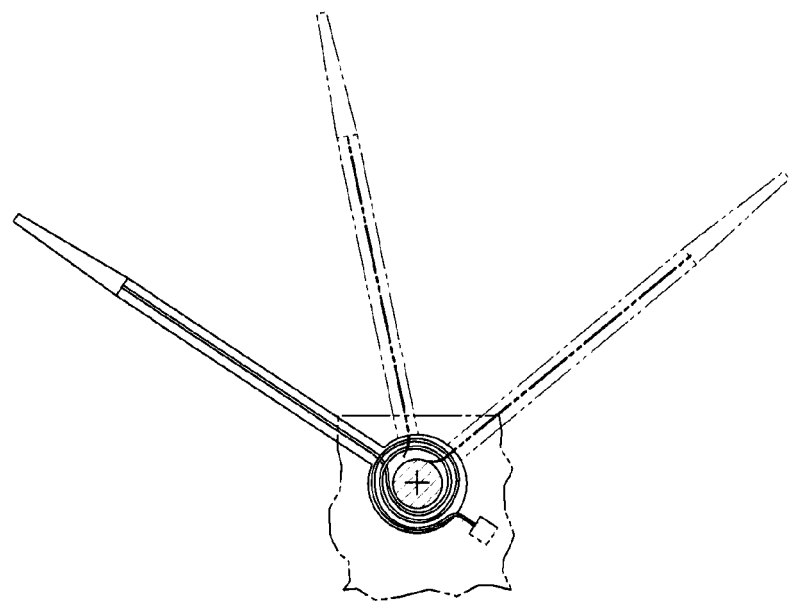
FIG. 1 is a prior art illustration of a pointer with a clock spring flex circuit.
Figure 2:
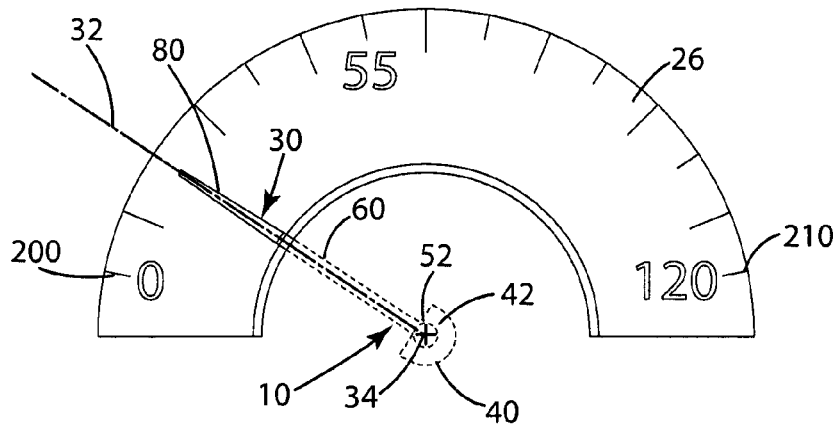
FIG. 2 is an exemplary illustration of a speedometer pointer including the present invention.

The pointer assembly 10 generally includes a pointer 30, a lighting system 90, and a drive mechanism 22 coupled to the pointer 30 with a shaft (not illustrated). The drive mechanism 22 controls the sweeping of the pointer, typically left to right or from a first position to a second position. Of course, the pointer 30 may be located at any given time between the first position 200 and second position 210 as illustrated in FIG. 2. The drive mechanism 22 generally forms a rotational axis 34 of the pointer 30. The pointer 30 also includes a longitudinal axis 32 extending generally along its extent in the direction it is pointing from the rotational axis 34.

The pointer 30 generally includes a base 40 connected to the shaft and an elongated member 60 extending therefrom. The base 40 may be formed in a variety of configurations, sizes, and shapes however, in the present invention, the base includes an arcuate portion 42. The arcuate portion 42 defines an arcuate channel 44 having a lower portion 46 and sidewalls 48. The arcuate portion 42 is generally arranged about a radial area centered about the rotational axis 34. The arcuate channel 44 is more specifically defined by an inner sidewall 47 and an outer sidewall 49. The lower portion 46 extends between the inner sidewall 47 and the outer sidewall 49. The inner sidewall 47 is formed about a first radius with the outer sidewall 49 formed approximately about a second radius with the second radius being greater than the first radius. The lower portion 46 forms the arcuate range between the inner sidewall 47 and outer sidewall 49. A retention mechanism such as the illustrated nub 50 may be included on one or more of the sidewalls. Extending from the arcuate portion 42 and to the elongated member 60 in the preferred embodiment is a cross channel 52. For ease of manufacturing, the pointer 30 may include a cross channel 52 extending from each side of the arcuate portion 42 toward the elongated member 60. The cross channel 52 may be formed in a variety of sizes, shapes, and configurations depending upon the preferred configuration for the pointer 30. The cross channel 52 is exemplarily illustrated as extending from the arcuate portion toward the elongated member wherein the cross channel 52 is approximately perpendicular to the elongated member 60 or longitudinal axis 32. Of course, one skilled in the art would readily recognize that the cross channel may be formed with its own arcuate shape or extend toward the elongated member 60 at an angle other than perpendicular to the longitudinal axis.

As discussed above, the pointer 30 includes the elongated member 60 extending from the base 40. The elongated member 60 generally extends along the longitudinal axis 32. The elongated member 60 includes an elongated channel 62 that is operationally connected to the cross channel 52. The elongated member 60 may be made in a variety sizes, shapes, and configurations and include various structural supports 64 that may vary depending upon the application as well as the length of the pointer. In the illustrated embodiment, the sidewalls 66 form the structural supports 64.

Actively lighted pointers allow configurations for gauges other than providing a completely visible pointer. Actively lighted pointers provide a variety of creative designs for instrument panels 20 and in particular gauges 26 that are not possible with traditionally lighted pointers. Traditional lighted pointers were typically mounted upon a shaft of the drive mechanism which extended through the back plate 22 of the instrument panel 20 also transferred light from below along the extent of the pointer. The complete extent of this style of pointer was completely visible. The present invention allows various configurations such as hiding from the operator of the vehicle the base 40 and elongated member as illustrated in the figures.

If the actively lighted pointer 30 includes portions hidden from the occupants of the vehicle, it may also include a riser 70 extending from the elongated member which passes the pointer through the back plate or face plate 21. If the pointer 30 includes a riser 70 it generally includes a riser channel 72 operationally connected to the elongated channel 62. Also, the riser 70 is generally arranged along a riser axis 74 which typically extends through the face of the instrument panel, in particular the back plate or face plate 21 of the instrument panel. The riser axis 74 preferably extends perpendicular through the face plate but other configurations may be used. In contrast, the elongated member 60 arranged along the longitudinal axis is generally located below the face plate 21 in the preferred embodiment.

Extending from either the elongated member 60 or as illustrated from the riser 70, a lighted pointer portion 80 is included. It is expected that the occupant of the vehicle will only see the visible lighted pointer and will not see the base 40 or elongated member 60. Included in the lighted pointer is an LED with a channel 84 extending from the riser channel 72 to the LED 82. Extending from the LED of the lighted pointer 80 is generally a light conducting portion 86.

Figure 5:
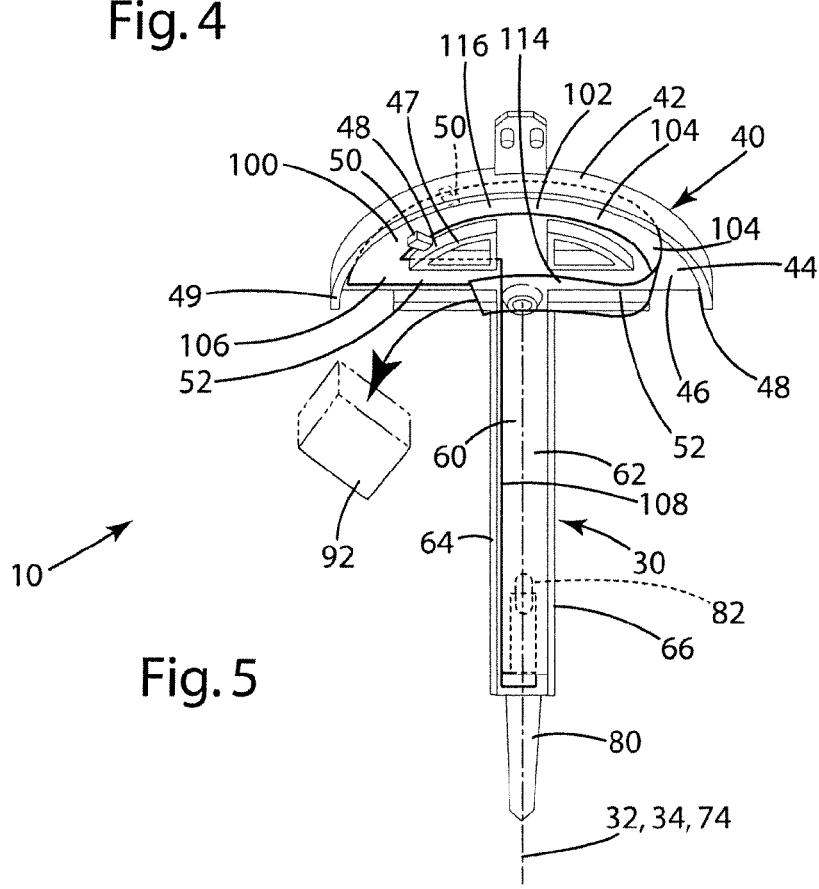
FIG. 5 is a bottom perspective view of the exemplary pointer of FIG. 3 in a middle or second position.
Figure 8:
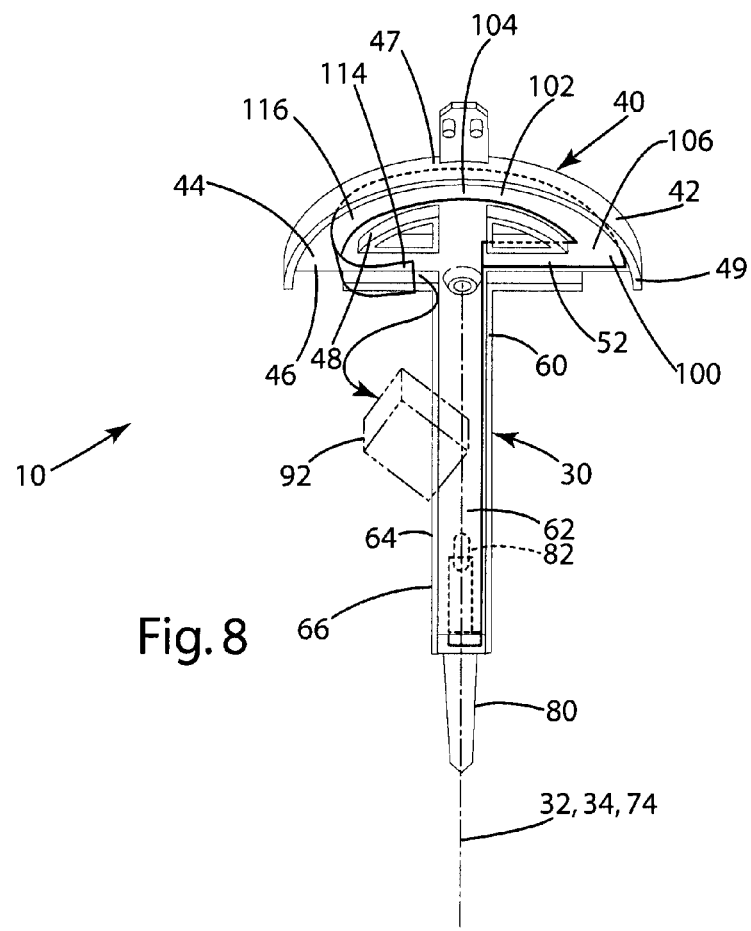
FIG. 8 is a bottom perspective view of the pointer of FIG. 6 in a middle position.
Figure 9:
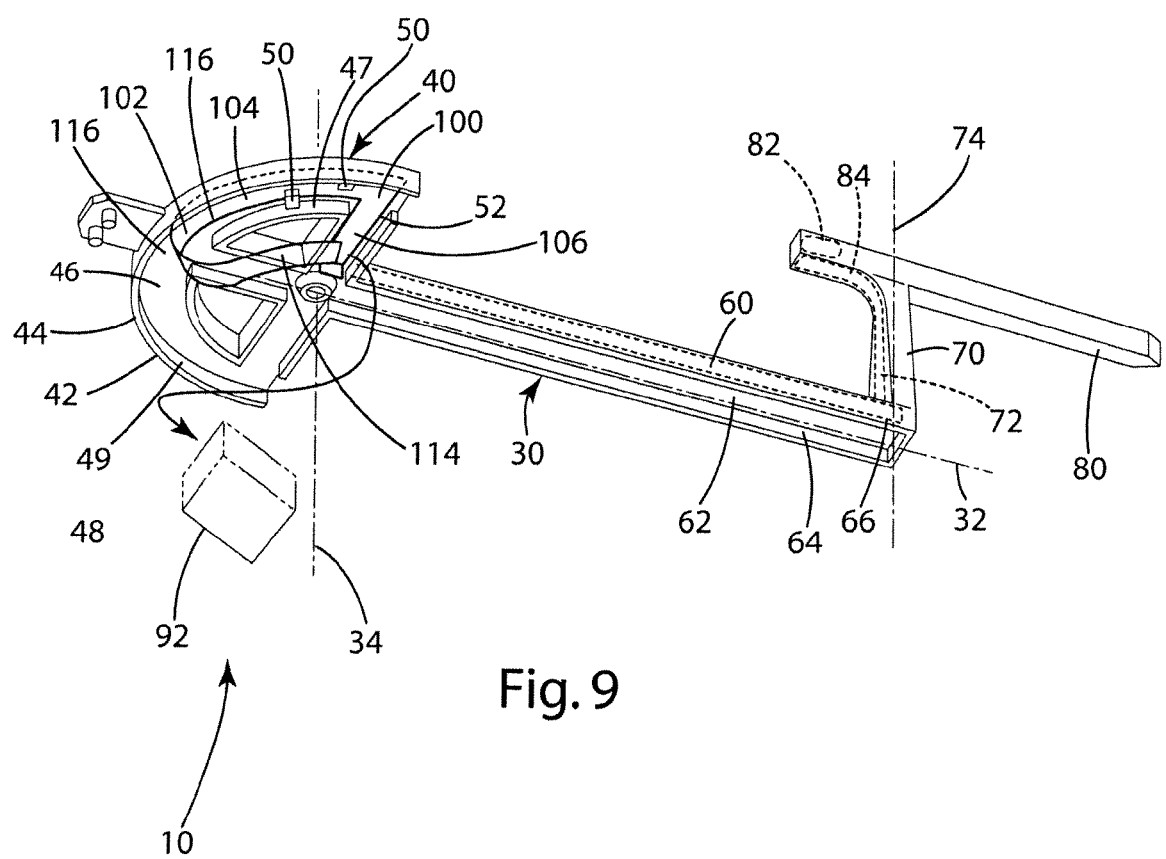
FIG. 9 is a bottom perspective view of the pointer of FIG. 6 with the pointer in a second or extended position with the arcuate member of the flex circuit substantially folded over upon itself.

The LED 82 is generally part of the lighting system 90. The lighting system 90 provides lighting and power to the LED 82 and is controlled by various lighting controls 92 which typically allow the intensity of the illumination to be varied between full brightness and no illumination. Extending between the LED 82 and lighting controls 92 is a flex circuit 100. The flex circuit 100 may be formed from any known material which provides electricity along its length but allows flexing of the material over numerous cycles. The present invention uses a flex circuit 100 which includes a base circuit 102 having an arcuate portion 104 and a cross portion 106. The base circuit 102 may be configured to fit substantially within a plane within the arcuate channel 44 when the pointer is in a rest or in fully extended position as illustrated in FIGS. 5 and 8, respectively. As the pointer 30 moves from the rest or fuller extended position, the flex circuit, in particularly the arcuate portion 104, will fold back upon itself (channel portion 116) in an approximately mirror image of the portion remaining in the arcuate channel 44. To ensure that the flex circuit 100 while being cycled does not become fully disengaged from the arcuate channel 44 and more particularly that a portion of the flex circuit particularly the arcuate member 104 closest to the cross portion 106 remains within the arcuate channel 44 by the retention mechanism or nubs 50. To minimize the amount of space needed for the flex circuit, the flex circuit may be formed to follow the contours of the channels such as the arcuate channel 44, cross channel 52, elongated channel 62, riser channel 72, and channel 84. As such, the flex circuit may include the base circuit 102 having an arcuate member 104 connected to the cross portion 106 which is in turn connected to the elongated circuit 108, riser circuit 110, and pointer circuit 112. The molded portions of the pointer are generally configured to allow for easy assembly of the flex circuit 100 within the channels.

Figure 3:
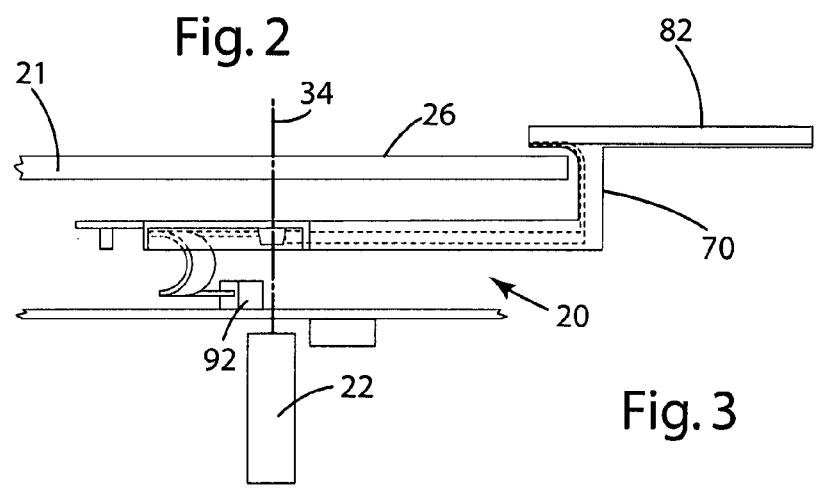
FIG. 3 is an exemplary sectional view of the instrument panel including the present invention.
Figure 4:
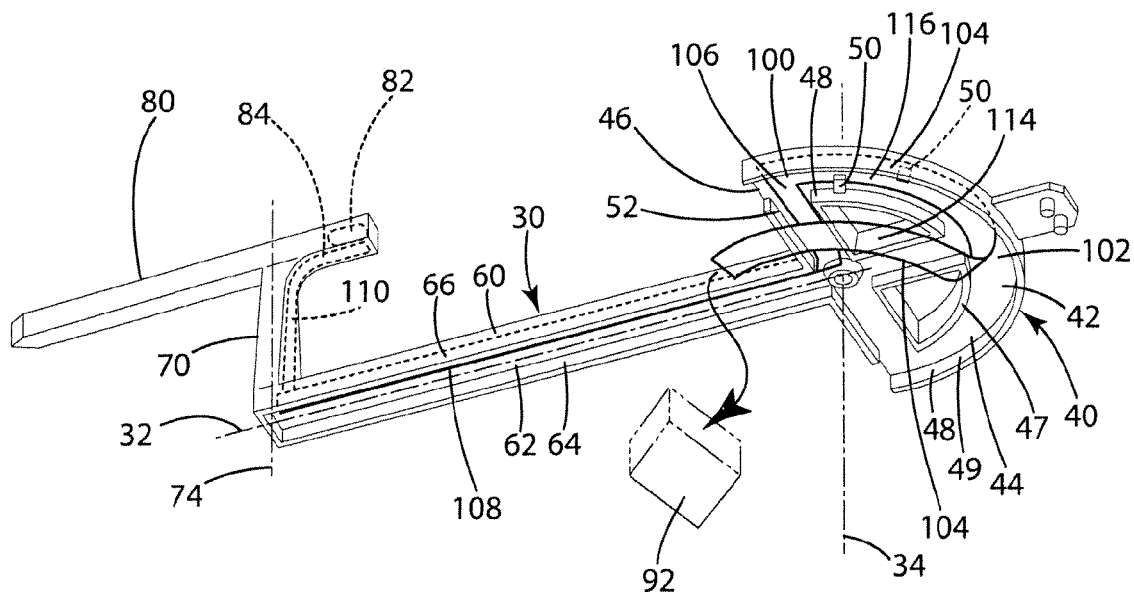
FIG. 4 is a bottom perspective view of an exemplary pointer in a first or rest position including a flex circuit.
Figure 6:
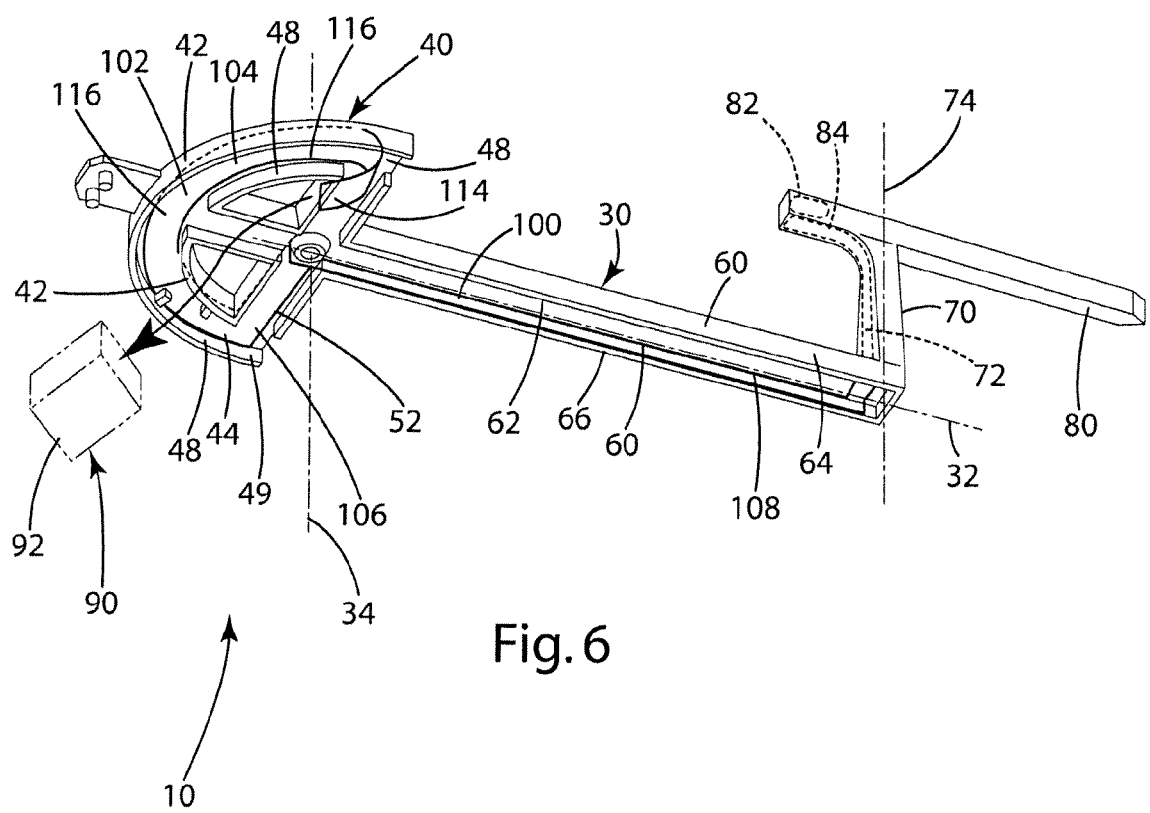
FIG. 6 is a bottom perspective view of the exemplary pointer of FIG. 3 but in a fully extended or second position with the arcuate member of the flex circuit being substantially located with the arcuate channel on the base of the pointer.
Figure 7:
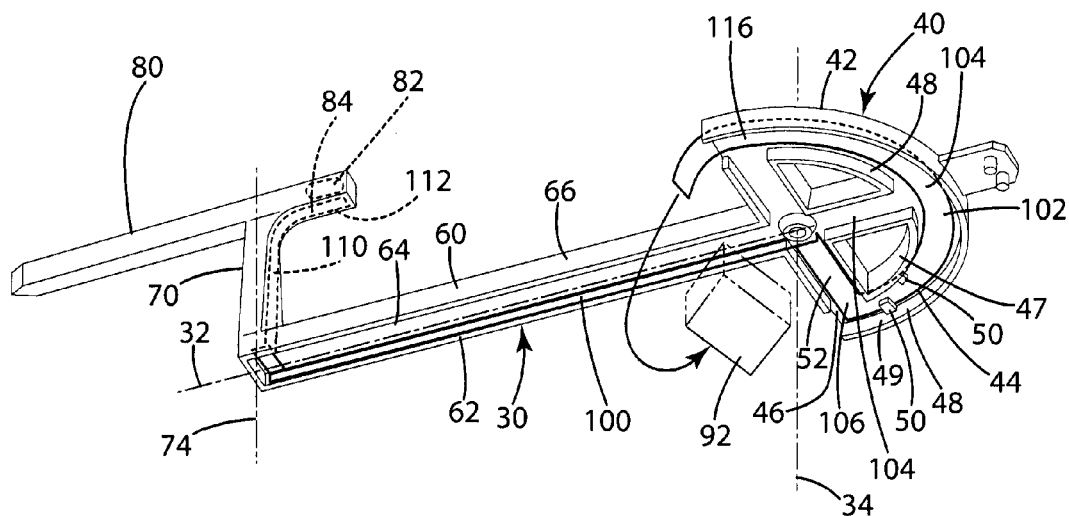
FIG. 7 is a bottom perspective view of an exemplary pointer in a first or rest position with the arcuate member of the flex circuit being substantially located with the arcuate channel on the base of the pointer.

During operation, the pointer moves from a first position, illustrated in FIGS. 3 and 6 across middle positions exemplary illustrated in FIGS. 4 and 7 and back to the first positions. Although a pointer for most gauges will rarely extend fully to a second position or fully rotationally extended position, this second position of position of greatest rotation is illustrated in FIGS. 5 and 8. If the flex circuit is designed to be substantially folded over as illustrated in FIG. 3 when the pointer is in a first position, as the pointer moves toward the second position, the flex circuit is placed back into the arcuate channel 44 and the amount of flex circuit forming the folded portion 114 decreases while the channel portion 116 increases. This increase may be seen by comparing the arcuate circuit portion 104 in both FIGS. 3 and 4. If the pointer continues to move to the second position until is becomes fully extended, the arcuate circuit portion 104 of the flex circuit would be substantially located within the arcuate channel 44.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A pointer for an instrument panel capable of moving between a first position and a second position, said pointer comprising:
    a base having an arcuate portion including an arcuate channel defined by sidewalls and a channel bottom;
    an elongated member extending from said base, said elongated member defining an elongated channel and a riser extending from said elongated member to a lighted pointer portion; and
    a lighting system including an LED and a flex circuit, said flex circuit having an arcuate flex member connected to an elongated flex member and wherein said arcuate flex member is configured to fit substantially in said actuate channel.

2. The pointer of claim 1 wherein said LED is situated in said lighted portion, said flex circuit extending between said lighted portion and a lighting circuit.

3. The pointer of claim 1 wherein said elongated flex member fits within said elongated channel.

4. The pointer of claim 1 wherein said arcuate flex member is substantially planar in the first position.

5. The pointer of claim 4 wherein said arcuate flex member is at least partially folded over itself in the second position.

6. The pointer of claim 5 wherein said partially folded over portion is substantially a mirror image of a portion remaining in said arcuate channel and wherein said partially folded over portion extends over said portion remaining in said channel.

7. The pointer of claim 6 wherein in the second position, the portion remaining within said arcuate channel is held in place by at least one nub extending from said sidewalls.

8. The pointer of claim 1 wherein said arcuate flex member folds over itself as the pointer moves from first position to the second position.

9. The pointer of claim 8 wherein an amount of said arcuate flex member in said arcuate channel increases as said pointer moves from the second position to the first position.

10. The pointer of claim 1 wherein said arcuate flex member includes an inner edge and said sidewalls include an inner sidewall and wherein said inner edge and said inner sidewall are approximately formed along the same radius.

11. The pointer of claim 10 wherein said inner edge is formed with a slightly greater radius to prevent said flex circuit from binding against said inner sidewall as said arcuate flex member is moved in and out of said arcuate channel as the pointer moves between first position and the second position.

12. The pointer of claim 1 wherein said arcuate flex member includes an outer edge and said sidewalls include an outer sidewall and wherein said outer edge and said outer sidewall are approximately formed along the same radius and wherein said outer sidewall has a slightly greater radius than said outer edge.

13. The pointer of claim 1 further including a rotational axis and wherein said arcuate channel is partially circumferentially located about said rotational axis and wherein said elongated channel extends through said rotational axis.

14. The pointer of claim 1 wherein said arcuate flex member includes inner and outer edges each having a radius and wherein the radii of said inner and outer edges approximately originates from a rotational axis.

15. The pointer of claim 1 further including a rotational axis and wherein said arcuate channel has a radius originating approximately from said rotational axis.

16. The pointer of claim 1 wherein said sidewalls include inner and outer sidewalls each having a radius and wherein the radii of said inner and outer sidewalls approximately originates from said rotational axis.

17. The pointer of claim 1 further including a rotational axis and an elongated longitudinal axis and wherein said rotational axis and said elongated longitudinal axis are approximately perpendicular.

18. The pointer of claim 1 further including a rotational axis and an elongated longitudinal axis and wherein said elongated longitudinal axis rotates about said rotational axis.

19. The pointer of claim 1 wherein said riser portion is approximately perpendicular to said elongated member and said lighted pointer portion.

20. The pointer of claim 1 wherein said elongated member and said lighted pointer portion are parallel.

21. A pointer for an instrument panel, said pointer comprising:
- a base having an arcuate portion including an arcuate channel and wherein said base is configured to rotate about a rotational axis;
- an elongated portion extending from said base and having a longitudinal axis;
- a flex circuit including an arcuate flex member at least partially arranged within said arcuate channel and wherein said arcuate flex member includes an inner and outer edge and a lateral extent between said inner and outer edges and wherein said inner edge is arranged a first distance away from said rotational axis and said outer edge is arranged a second distance away from the rotational axis wherein said second distance is greater than said first distance and wherein said lateral extent is substantially perpendicular to said rotational axis.

22. The pointer of claim 21 wherein said flex circuit further includes an elongated flex member extending from said arcuate flex member and extending along said longitudinal axis.

23. The pointer of claim 22 further including a riser extending from said elongated portion and including a riser channel operationally connected to said elongated channel.

24. The pointer of claim 23 further including a lighted pointer portion and wherein said flex circuit extends to an LED in said lighted pointer portion.

25. The pointer of claim 21 wherein said base is integral with said elongated portion.

26. A pointer for an instrument panel, said pointer comprising:
- a base having an arcuate portion including an arcuate channel and wherein said base is configured to rotate about a rotational axis;
- an elongated portion extending from said base and having a longitudinal axis passing through the rotational axis;
- a flex circuit including an arcuate flex member at least partially arranged within said arcuate channel and wherein said arcuate flex member extends less than 365 degrees around the rotational axis, and an elongated flex member extending from said arcuate flex member along said longitudinal axis.

27. The flex circuit of claim 26 wherein said arcuate flex member is substantially planar and wherein a planar surface is approximately perpendicular to said rotational axis.

28. The flex circuit of claim 26 wherein said arcuate flex member is substantially planar and wherein a planar surface is not arranged along said rotational axis.

29. The flex circuit of claim 28 wherein said planar surface is substantially arranged along said longitudinal axis.

30. The portion of claim 26 further including a cross channel extending from said arcuate portion toward the rotational axis and to the elongated channel.

31. The pointer of claim 26 wherein the flex circuit extends less than 365 degrees around the rotational axis.

* * * * *

UNITED STATES PATENT AND TRADEMARK OFFICE
CERTIFICATE OF CORRECTION

| | | |
|---|---|---|
| PATENT NO. | : 7,681,517 B2 | Page 1 of 1 |
| APPLICATION NO. | : 12/039199 | |
| DATED | : March 23, 2010 | |
| INVENTOR(S) | : Matthew Ritthaler et al. | |

It is certified that error appears in the above-identified patent and that said Letters Patent is hereby corrected as shown below:

In The Specification:

Column 6, Line 34, should read as follows: -- the pointer moves between the first position and the second posi- --

In The Claims:

Column 8, Line 24, should read as follows: -- 30. The pointer of claim 26 further including a cross chan- --

Signed and Sealed this

Eighth Day of June, 2010

David J. Kappos
*Director of the United States Patent and Trademark Office*